US012532365B2

(12) United States Patent
Cheng et al.

(10) Patent No.: US 12,532,365 B2
(45) Date of Patent: Jan. 20, 2026

(54) RELAY DISCOVERY POOL FOR SIDELINK

(71) Applicant: QUALCOMM Incorporated, San Diego, CA (US)

(72) Inventors: Peng Cheng, Beijing (CN); Karthika Paladugu, San Diego, CA (US); Hong Cheng, Basking Ridge, NJ (US); Sudhir Kumar Baghel, Pleasanton, CA (US); Kapil Gulati, Belle Mead, NJ (US); Junyi Li, Fairless Hills, PA (US); Seyedkianoush Hosseini, San Diego, CA (US); Gavin Bernard Horn, La Jolla, CA (US); Gabi Sarkis, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 489 days.

(21) Appl. No.: 17/905,811

(22) PCT Filed: Apr. 8, 2020

(86) PCT No.: PCT/CN2020/083754
§ 371 (c)(1),
(2) Date: Sep. 7, 2022

(87) PCT Pub. No.: WO2021/203293
PCT Pub. Date: Oct. 14, 2021

(65) Prior Publication Data
US 2023/0136426 A1 May 4, 2023

(51) Int. Cl.
*H04W 76/14* (2018.01)
*H04W 28/02* (2009.01)
*H04W 40/24* (2009.01)

(52) U.S. Cl.
CPC ....... *H04W 76/14* (2018.02); *H04W 28/0268* (2013.01); *H04W 40/246* (2013.01)

(58) Field of Classification Search
CPC ............ H04W 76/14; H04W 28/0268; H04W 40/246; H04W 8/005; H04W 72/40;
(Continued)

(56) References Cited

U.S. PATENT DOCUMENTS 11,665,709 B1 * 5/2023 Pan ........................ H04W 72/25
370/329
11,844,076 B2 * 12/2023 Paladugu .............. H04W 72/21
(Continued)

FOREIGN PATENT DOCUMENTS

| CN | 105228082 A | 1/2016 |
| CN | 106488424 A | 3/2017 |

(Continued)

OTHER PUBLICATIONS

Supplementary European Search Report—EP20929833—Search Authority—The Hague—Nov. 20, 2023.
(Continued)

Primary Examiner — Abdullahi Ahmed
(74) Attorney, Agent, or Firm — Patterson & Sheridan, LLP

(57) ABSTRACT

Certain aspects provide a method for wireless communication by a user-equipment (UE). The method generally includes determining a configuration of resources for discovery of a relay UE of a plurality of relay UEs, wherein the resources are used by each of the plurality of relay UEs for communication of one or more discovery messages, performing discovery operations to connect with the relay UE in accordance with the configuration, and communicating with a base station through the relay UE after connecting with the relay UE.

30 Claims, 11 Drawing Sheets

(58) Field of Classification Search
CPC ..... H04W 88/04; H04W 92/18; H04W 40/22;
H04W 40/24; H04W 40/12
See application file for complete search history.

(56) References Cited

U.S. PATENT DOCUMENTS

| | | |
|---|---|---|
| 2016/0285539 A1 | 9/2016 | Sadiq et al. |
| 2016/0295494 A1 | 10/2016 | Gulati et al. |
| 2021/0315057 A1* | 10/2021 | Baek ..................... H04W 76/10 |
| 2022/0279482 A1* | 9/2022 | Xue ...................... H04W 72/23 |
| 2023/0010134 A1* | 1/2023 | Zhou ....................... H04W 8/24 |
| 2023/0096462 A1* | 3/2023 | Turyagyenda ........ H04W 24/08 370/329 |
| 2023/0120582 A1* | 4/2023 | Zhang ................... H04W 60/00 370/329 |
| 2023/0247445 A1* | 8/2023 | Paladugu ............. H04W 76/14 370/315 |
| 2024/0205768 A1* | 6/2024 | Cheng ................... H04W 88/04 |

FOREIGN PATENT DOCUMENTS

| | | |
|---|---|---|
| EP | 3235295 A1 | 10/2017 |
| WO | 2018071517 A1 | 4/2018 |

OTHER PUBLICATIONS

International Search Report and Written Opinion—PCT/CN2020/083754—ISA/EPO—Dec. 30, 2020.

\* cited by examiner

RELAY DISCOVERY POOL FOR SIDELINK

CROSS-REFERENCE TO RELATED APPLICATIONS

This application is a national stage application under 35 U.S.C. 371 of PCT/CN2020/083754, filed Apr. 8, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for sidelink communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved feedback signaling.

Certain aspects provide a method for wireless communication by a user-equipment (UE). The method generally includes determining a configuration of resources for discovery of a relay UE of a plurality of relay UEs, wherein the resources are used by each of the plurality of relay UEs for communication of one or more discovery messages, performing discovery operations to connect with the relay UE in accordance with the configuration, and communicating with a base station through the relay UE after connecting with the relay UE.

Certain aspects provide a method for wireless communication. The method generally includes determining a configuration of resources for discovery of a UE, wherein the resources are used by each of a plurality of relay UEs for communication of one or more discovery messages, the relay UE being one of the plurality of relay UEs, performing discovery operations to connect with the UE in accordance with the configuration, and relaying communications between a base station and the UE after connecting with the UE.

Certain aspects provide an apparatus for wireless communication by a user-equipment (UE). The apparatus generally includes a processing system configured to determine a configuration of resources for discovery of a relay UE of a plurality of relay UEs, wherein the resources are used by each of the plurality of relay UEs for communication of one or more discovery messages, and perform discovery operations to connect with the relay UE in accordance with the configuration, and a transceiver configured to communicate with a base station through the relay UE after connecting with the relay UE.

Certain aspects provide an apparatus for wireless communication by a relay UE. The apparatus generally includes a processing system configured to determining a configuration of resources for discovery of a UE, wherein the resources are used by each of a plurality of relay UEs for communication of one or more discovery messages, the relay UE being one of the plurality of relay UEs, and perform discovery operations to connect with the UE in accordance with the configuration, and a transceiver configured to relay communications between a base station and the UE after connecting with the UE.

Certain aspects provide an apparatus for wireless communication. The apparatus generally includes a processing system configured to determine a configuration of resources for discovery operations by of a remote UE and relay UE, wherein the resources are used by each of a plurality of relay UEs for communication of one or more discovery messages, the relay UE being one of the plurality of relay UEs, and a transmitter configured to transmit an indication of the configuration of resources.

Certain aspects provide an apparatus for wireless communication by a user-equipment (UE). The apparatus generally includes means for determining a configuration of resources for discovery of a relay UE of a plurality of relay UEs, wherein the resources are used by each of the plurality of relay UEs for communication of one or more discovery messages, means for performing discovery operations to connect with the relay UE in accordance with the configuration, and means for communicating with a base station through the relay UE after connecting with the relay UE.

Certain aspects provide an apparatus for wireless communication by a relay UE. The apparatus generally includes means for determining a configuration of resources for discovery of a UE, wherein the resources are used by each of a plurality of relay UEs for communication of one or more discovery messages, the relay UE being one of the plurality of relay UEs, means for performing discovery operations to connect with the UE in accordance with the configuration, and means for relaying communications between a base station and the UE after connecting with the UE.

Certain aspects provide an apparatus for wireless communication. The apparatus generally includes means for determining a configuration of resources for discovery operations by of a remote UE and relay UE, wherein the resources are used by each of a plurality of relay UEs for communication of one or more discovery messages, the relay UE being one of the plurality of relay UEs, and means for transmitting an indication of the configuration of resources.

Certain aspects provide a computer-readable medium having instructions stored thereon to cause a user-equipment (UE) to determine a configuration of resources for discovery of a relay UE of a plurality of relay UEs, wherein the resources are used by each of the plurality of relay UEs for communication of one or more discovery messages, perform discovery operations to connect with the relay UE in accordance with the configuration, and communicate with a base station through the relay UE after connecting with the relay UE.

Certain aspects provide a computer-readable medium having instructions stored thereon to cause a relay UE to determine a configuration of resources for discovery of a UE, wherein the resources are used by each of a plurality of relay UEs for communication of one or more discovery messages, the relay UE being one of the plurality of relay UEs, perform discovery operations to connect with the UE in accordance with the configuration, and relay communications between a base station and the UE after connecting with the UE.

Certain aspects provide a computer-readable medium having instructions stored thereon to cause a relay UE to determine a configuration of resources for discovery operations by of a remote UE and relay UE, wherein the resources are used by each of a plurality of relay UEs for communication of one or more discovery messages, the relay UE being one of the plurality of relay UEs, and transmit an indication of the configuration of resources.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for relay selection. For example, a remote UE may connect to a relay UE as a means for communicating with a base station. In other words, the relay UE may relay communications between the remote UE and the base station. In some aspects, the remote UE may perform radio link measurements of other relay UEs while having an established link with a serving relay UE, allowing the remote UE to perform reselection of a different relay UE if signal quality of the established link degrades. For example, the remote UE may perform radio link measurements on reference signals (RSs) on discovery messages from relay UEs to determine whether relay UE reselection is warranted, and discover a relay UE for reselection.

The following description provides examples of configurations for SL communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
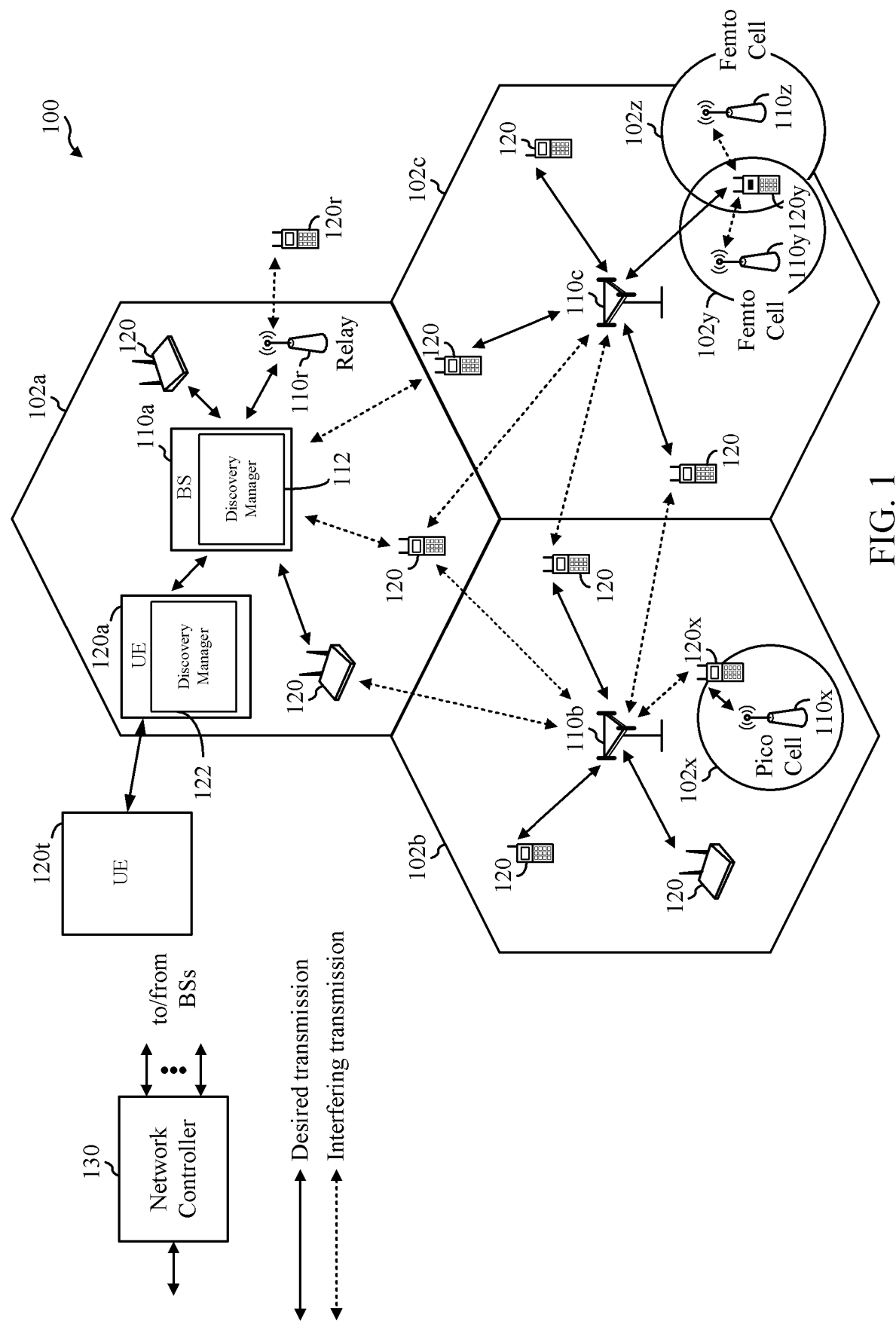
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured to perform discovery operations. As shown in FIG. 1, the UE 120a includes a discovery manager 122. The discovery manager 122 may be configured to perform discovery operations for reselection of a relay UE, as described in more detail herein. The BS 110 may also include a discovery manager 112. The discovery manager 112 may configure resources for relay selection using discovery messages, as described in more detail herein.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
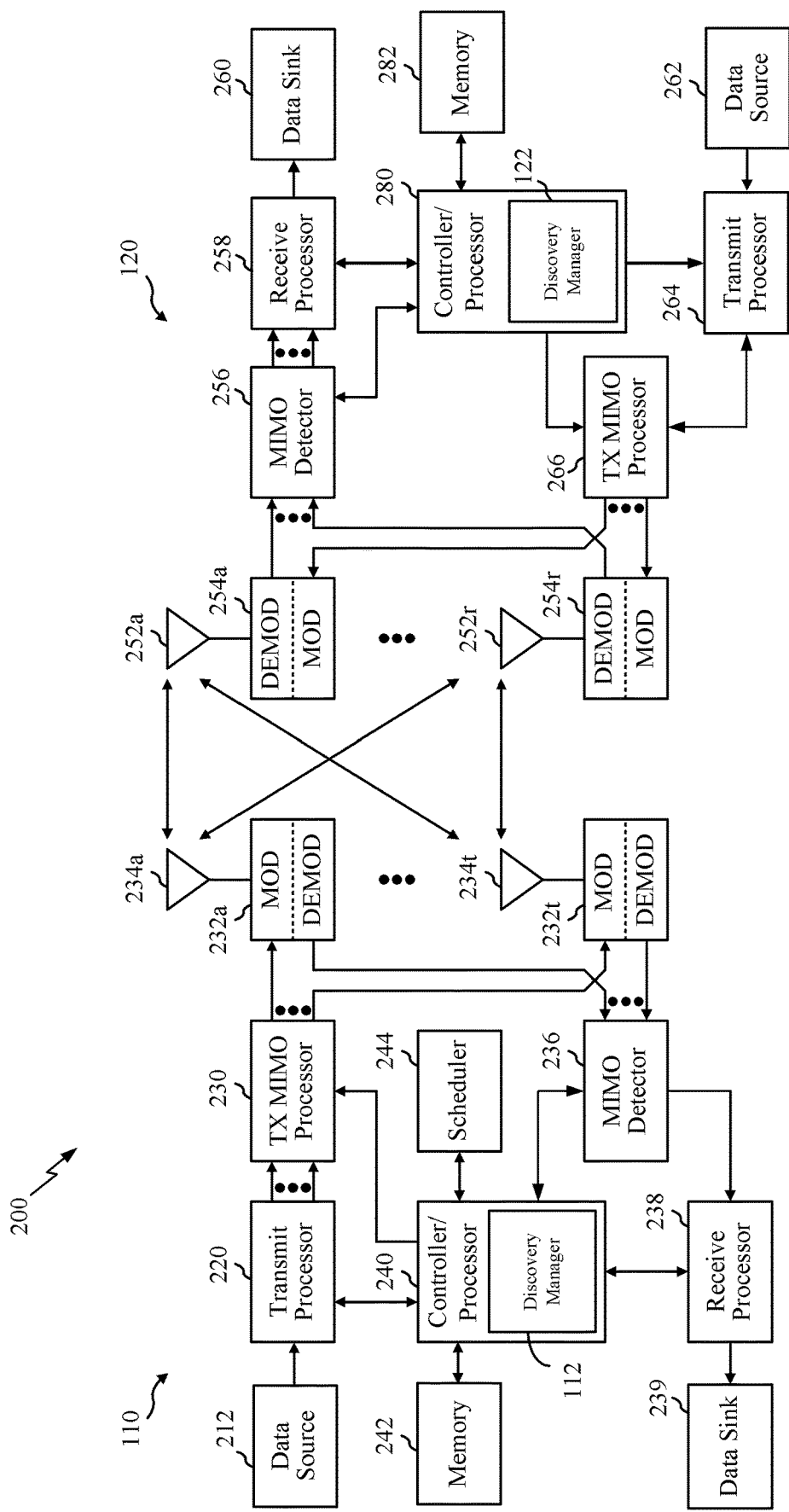
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-

254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has the discovery manager 122, and the controller/processor 280 of the BS 110 has the discovery manager 112. Although shown at the Controller/Processor, other components of the UE 120a may be used performing the operations described herein.

Figure 3B:
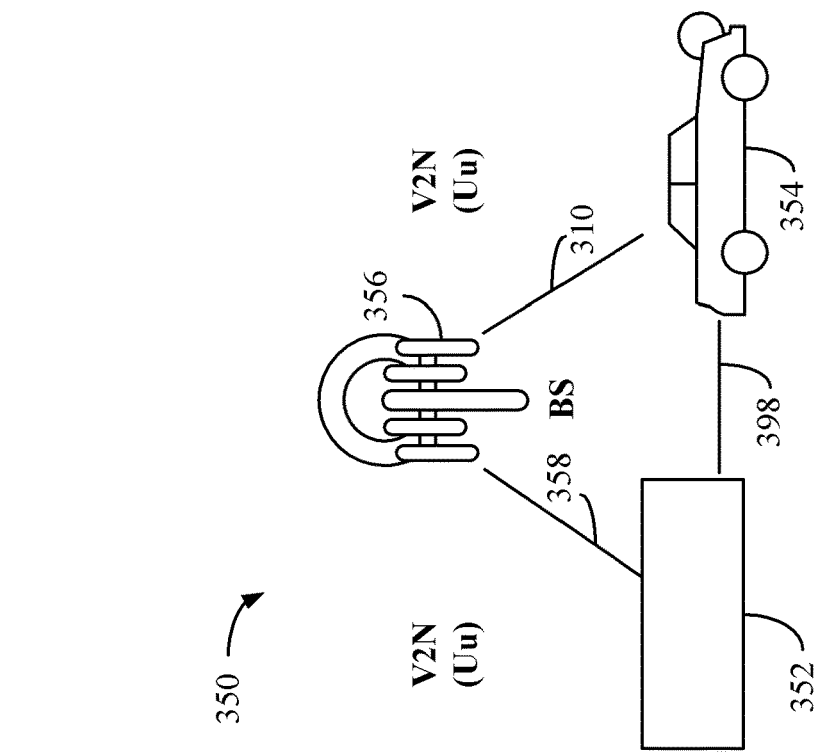
FIGS. 3A and 3B show diagrammatic representations of example vehicle to everything (V2X) systems in accordance with some aspects of the present disclosure.
Figure 3A:
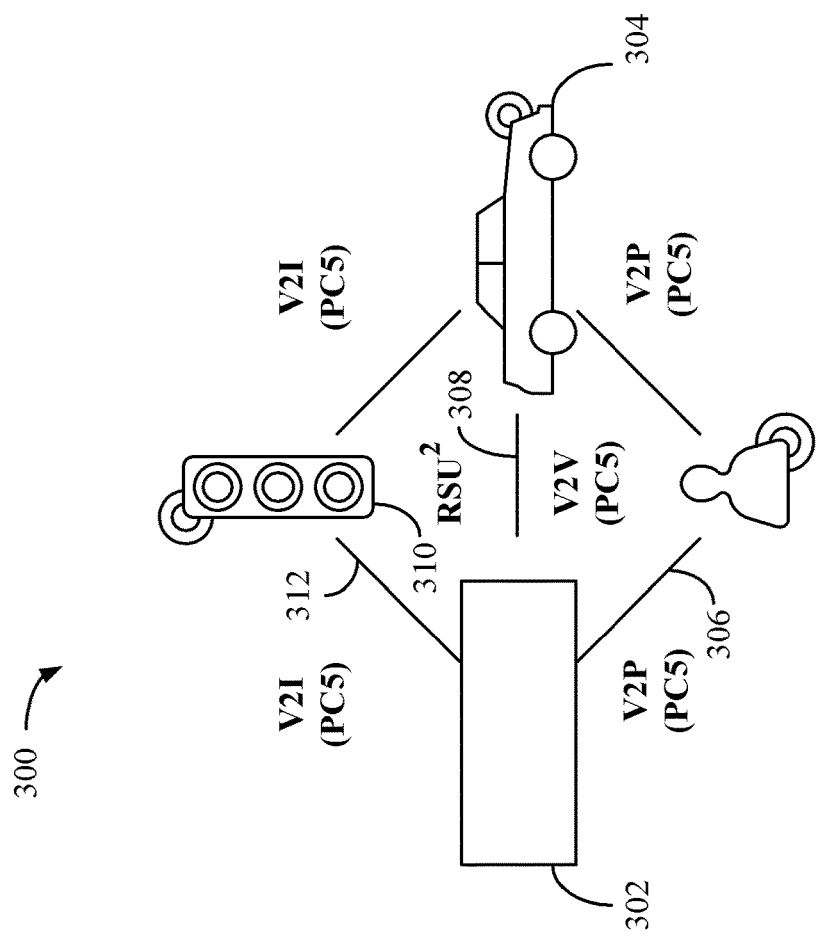

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Techniques for Configuring a Discovery Pool for Sidelink

Certain aspects of the present disclosure to techniques for configuring a pool of resources for discovery (also referred to as a discovery pool) to be used for sidelink communication. Discovery operations as described herein are used by remote UEs to connect to a relay UE. In certain aspects of the present disclosure, resources for discovery may be common across relay UEs. The remote UE may perform radio link measurements of other relay UEs while having an established link a serving relay UE, allowing the remote UE to perform reselection of a different relay UE if signal quality of the established link degrades, as described in more detail herein For long-term evolution (LTE), discovery pool and communication pool may be separately configured in a radio resource control (RRC) reconfiguration message, system information block (SIB), or may be preconfigured (e.g., in a standard). For example, common communication pools may be provided in LTE SIB18, and common discovery pools may be provided in LTE SIB19, for UE's in idle mode of operation. A common pool of resources generally refers to resources available to multiple UEs for a particular purpose (e.g., data communication or discovery). Common communication and discovery pools may be separately provided in pre-configuration for out-of-coverage (OOC) UEs. Dedicated communication and discovery pools may be separately provided in RRC reconfiguration message for UEs in a connected mode of operation. A dedicated pool of resources generally refers to resources dedicated to a particular UE for communication or discovery.

In some cases, transmit (TX) and receive (RX) pools may be configured. For example, a common TX pool may be configured in SIB or preconfigured. The common TX pool may be overwritten by dedicated configuration via RRC reconfiguration message. RX pool may always be common across UEs for LTE, and may be only provided (e.g., configured) via RRC message upon handover (HO) from one cell to another. An RX pool may be agnostic to the RRC state of the UE. In some implementations, dedicated assignment of resources may only be configured for a TX pool.

There are various differences between discovery and communication pools. For example, sidelink control information (SCI) may not be used for discovery messages. Both communication and discovery pools may be defined by a periodic subframe pool of resources in time domain and periodic pool of resource blocks (RBs) in frequency domain. Communication pool and discovery pool may share the same RB pool definition in LTE. For example, the bandwidth for discovery and communication pools may be 2 RB to 200 RB, and the start position of the pools of resources may be configurable. For a communication pool, separate frequency allocations may be defined for control and data transmissions. The communication pool and discovery pool may use different periodicity configurations. For instance, the periodicity of communication pool may be 40 ms to 320 ms, but the periodicity for discovery pool may be 320 ms to 10.24 seconds. In other words, communication pools may be denser than discovery pools.

Figure 4A:
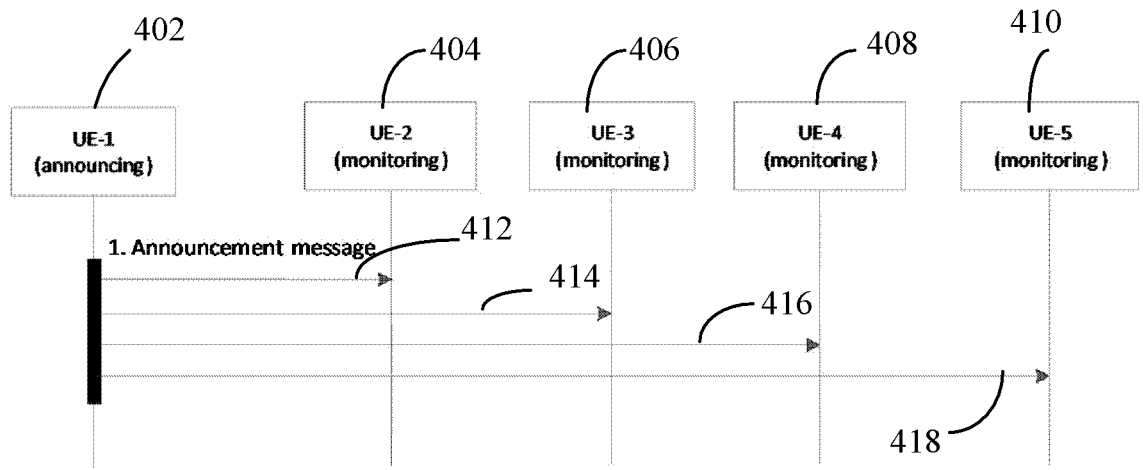
FIGS. 4A and 4B illustrate messages for discovery in sidelink.
Figure 4B:
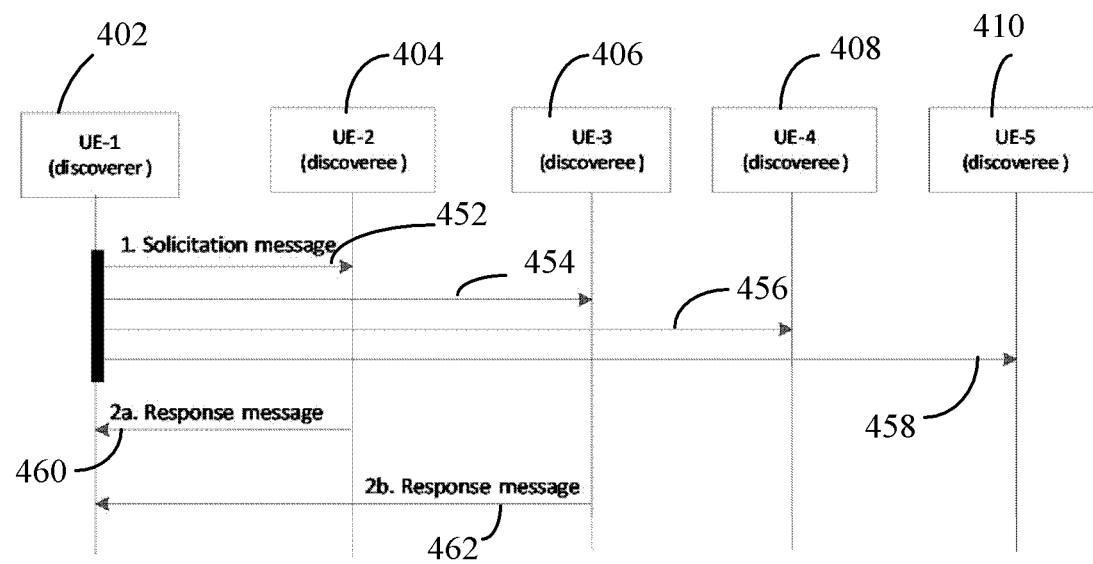

FIGS. 4A and 4B illustrate messages for discovery in sidelink. FIG. 4A illustrates a discovery protocol referred to as "Model A" discovery. As illustrated, UE 402 may transmit announcement messages 412, 414, 416, 418 using a pool of resources configured for discovery. The announcement messages may be received by other UEs 404, 406, 408, 410 that may be monitoring for the announcement messages. The announcement messages may be sent in a PC5 communication channel, as described with respect to FIG. 3. Once received, one or more of the announcement messages may be used for the UE 402 to connect with one or more of UEs 404, 406, 408, 410.

FIG. 4B illustrates a discovery protocol referred to as "Model B" discovery. As illustrated, UE 402 may be a discoverer UE and may be transmitting solicitation messages 452, 454, 456, 458. The solicitation messages may be received by one or more UEs 404, 406, 408, 410. For example, as illustrated, UE 404 and UE 406 may transmit response messages 460, 462 back to UE 402 to facilitate connection on sidelink. For instance, the UE 402 may perform channel measurements to select one of the UEs 404, 406 having the highest link quality, and perform connection establishment with the selected UE.

Figure 5:
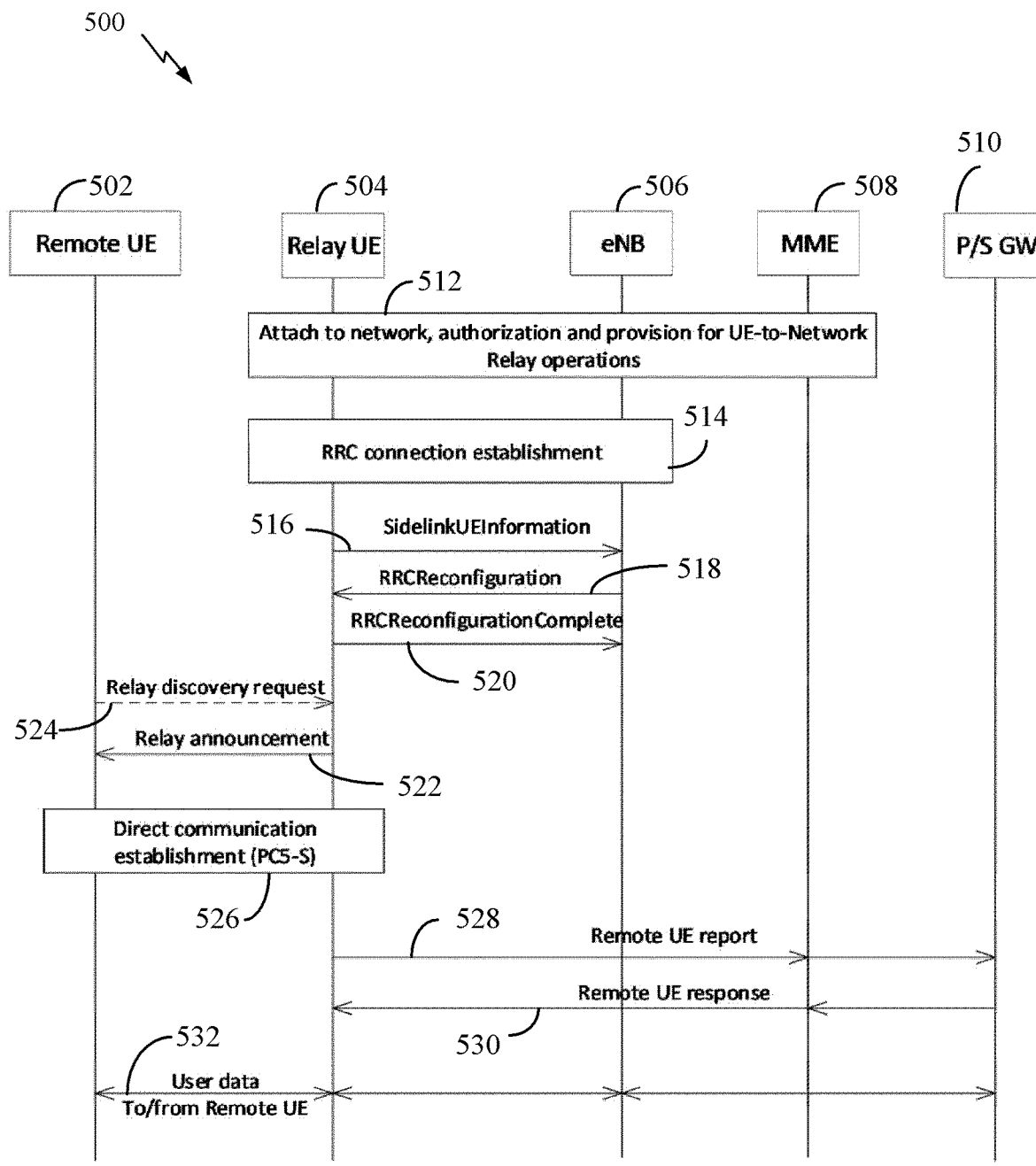
FIG. 5 illustrates a protocol for relay selection, in accordance with certain aspects of the present disclosure.

FIG. 5 illustrates a protocol 500 for relay selection, in accordance with certain aspects of the present disclosure. As illustrated, a UE 504 may act as a relay UE to relay data between the UE 502 and the network (e.g., gateway (GW) 510). For example, at block 512, the UE 504 may attached to the network, and perform authorization and provision for UE to network relay operations. At block 514, the UE 504 may establish RRC connection with base station 506 (e.g., eNB). The UE 504 may then transmit sidelink UE information 516 to base station 506, receive RRC reconfiguration message 518, and transmit RRC reconfiguration complete message 520.

Once RRC reconfiguration has been completed, discovery operations may be performed. The remote UE 502 may identify the presence of at least one suitable relay UE to request relay service in its proximity. The relay UE is identified via a discovery message. For example, the relay UE may announce its presence by transmitting sidelink (SL) discovery messages periodically (e.g., in accordance with Model A discovery) or the remote UE may transmit a SL discovery solicitation message, expecting a relay nearby to respond (e.g., in accordance with Model B discovery).

For example, the relay UE 504 may transmit a relay announcement 522 to a remote UE 502. The relay announcement 522 may correspond to one of announcement messages 412, 414, 416, 418 described with respect to FIG. 4A. In some cases, the relay announcement 522 may correspond to one of response messages 460, 462 described with respect to FIG. 4B. For example, for Model B discovery, the remote UE 502 may transmit a relay discovery request 524 (e.g., corresponding to one of solicitation messages 452, 454, 456, 458), and the relay announcement 522 may be in response to the relay discovery request 524. At block 526, direct communication may be established based on the relay announcement 522. In other words, during relay discovery, the remote UE 502 obtains the UE ID of the relay UE 504 to be used for SL transmission and reception of the relayed traffic.

As illustrated, the relay UE 504 may transmit a remote UE report 528 to the Mobility Management Entity (MME) 508 indicating that the relay UE will be acting as a relay for remote UE 502. The relay UE 504 may then receive a remote UE response 530, after which user data 532 may be communicated between the remote UE 502 and the network with the relay UE 504 acting as a relay.

In some cases, a relay service code may be provided to the relay UE. The relay service code may be requested from the network by the remote UE. Relay service codes identify a connectivity service the relay UE provides. Different relay service codes may be assigned for different PC5 services (e.g., for Public Safety Police members, Public Safety Fire Fighters, NCIS Gaming, NCIS Virtual conference). Remote UEs interested in a UE-to-NW relay may monitor only corresponding relay service code(s) to connect with a relay UE. Relay service codes may be provisioned to the UE (either pre-configured or provisioning by the PCF to the UE during Uu Registration). Security information for discovery messages may be provisioned during a key management process. L3 Relay UE establishes dedicated protocol data unit (PDU) session associated with one or more relay service codes.

Certain aspects of the present disclosure are generally directed to techniques for relay UE reselection, and measurements to facilitate reselection. For example, resources for discovery operations may be configured that are common across relay UEs. A remote UE may perform measurements on discovery messages to determine whether to reselect a different relay UE for data communication.

Figure 6:
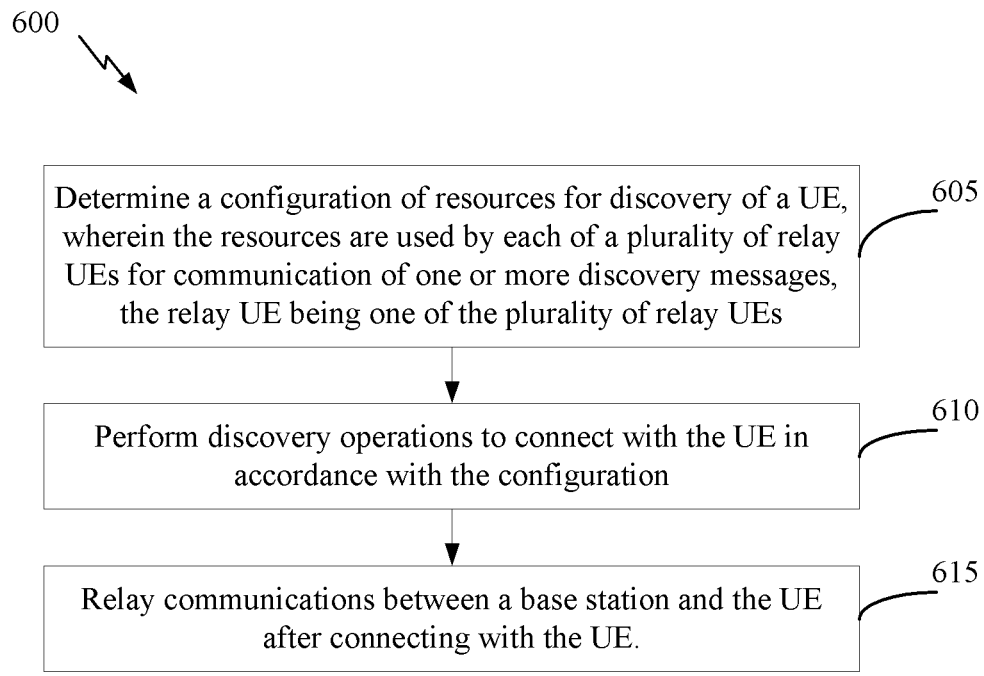
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a relay UE (e.g., such as a UE 120*t* in the wireless communication network 100).

Operations 600 may be implemented as software components that are executed and run on one or more processors (e.g., controller/processor 280 of FIG. 2). Further, the transmission and reception of signals by the relay UE in operations 600 may be enabled, for example, by one or more antennas (e.g., antennas 252 of FIG. 2). In certain aspects, the transmission and/or reception of signals by the relay UE may be implemented via a bus interface of one or more processors (e.g., controller/processor 280) obtaining and/or outputting signals.

The operations 600 may begin, at block 605, by the relay UE determining a configuration of resources for discovery of a UE, wherein the resources are used by each of a plurality of relay UEs for communication of one or more discovery messages, the relay UE being one of the plurality of relay UEs. At block 610, the relay UE performs discovery operations to connect with the UE in accordance with the configuration, and at block 615, relays communications between a base station and the UE after connecting with the UE.

Figure 7:
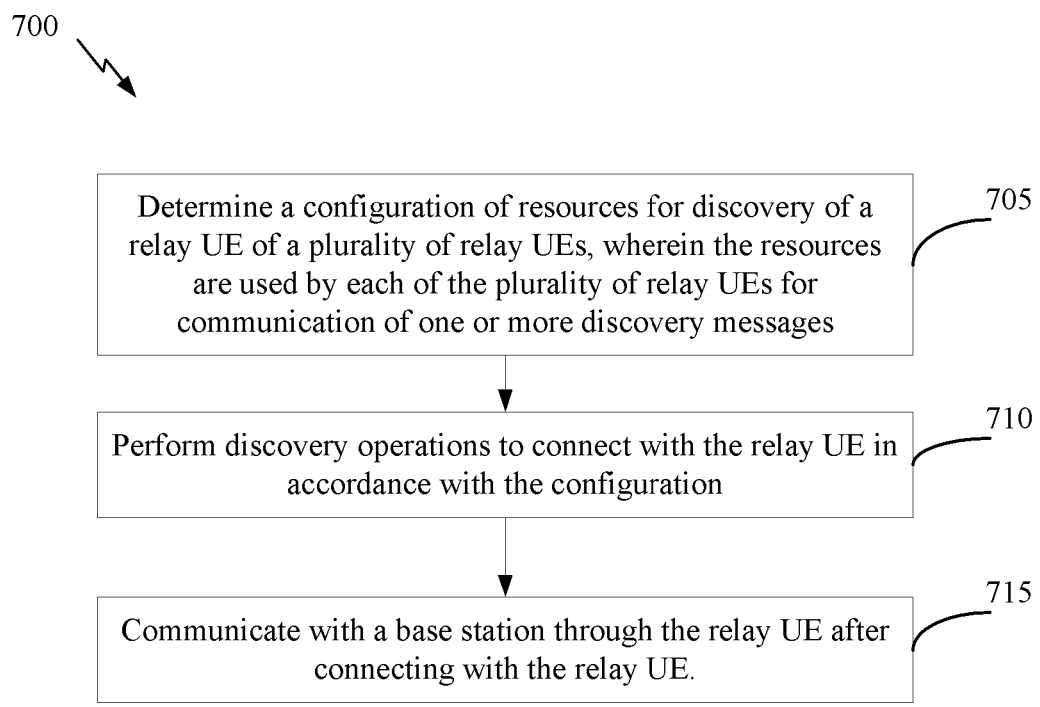
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by a remote UE (e.g., such as a UE 120*t* in the wireless communication network 100).

Operations 700 may be implemented as software components that are executed and run on one or more processors (e.g., controller/processor 280 of FIG. 2). Further, the transmission and reception of signals by the remote UE in operations 600 may be enabled, for example, by one or more antennas (e.g., antennas 252 of FIG. 2). In certain aspects, the transmission and/or reception of signals by the remote UE may be implemented via a bus interface of one or more processors (e.g., controller/processor 280) obtaining and/or outputting signals.

The operations 700 may begin, at block 705, by determining a configuration of resources for discovery of a relay UE of a plurality of relay UEs, wherein the resources are used by each of the plurality of relay UEs for communication of one or more discovery messages. In other words, the resources may be common across the plurality of relay UEs. At block 710, the remote UE performs discovery operations to connect with the relay UE in accordance with the configuration, and at block 715, communicates with a base station through the relay UE after connecting with the relay UE.

In other words, to support UEs in idle mode or connected mode, as well as out-of-coverage (OOC) remote UEs, the transmit (TX)/receive (RX) discovery resource pools may be common across relays. In certain aspects, separate general discovery pools (e.g., commercial discovery pools) and relay discovery pool configuration may be configured. The general discovery pool refers to a pool of resources that may be used for commercial discovery operations (e.g., in addition to relay discovery), whereas a relay discovery pool are resources designated for relay UE discovery.

Figure 8:
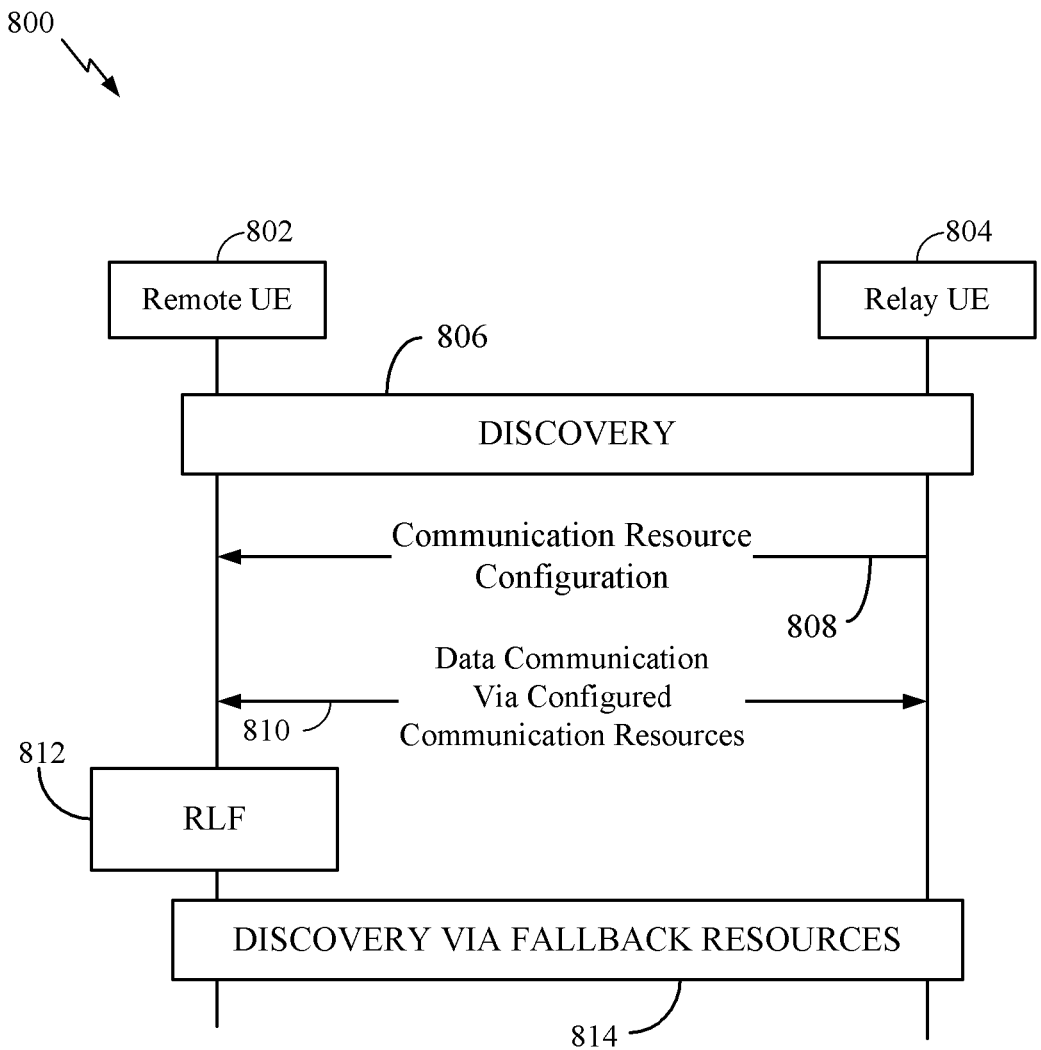
FIG. 8 illustrates an example protocol for fallback discovery, in accordance with certain aspects of the present disclosure.

FIG. 8 illustrates an example protocol 800 for fallback discovery, in accordance with certain aspects of the present disclosure. In certain aspects, a fallback resource pool may be configured at a relay UE 804 and remote UE 802. For example, one small OOC pool (also referred to as fallback pool) may be preconfigured for relay discovery. Both the relay UE 804 and the remote UE 802 may use the OOC pool for discovery, at block 806, as illustrated. Once unicast link is setup between the remote UE and the relay UE, additional resource pool may be configured and used for data communication 810 and discovery (e.g., measurement of discovery messages for relay UE reselection). For example, the relay UE may configure the additional resource pool via a PC5 RRC message 808 (either SIB or RRC dedicated) forwarding the additional resource pool configuration to remote UE 802. TheAs soon as the remote UE 802 detects radio link failure (RLF) 812 (or signal quality of sidelink dropping below a threshold), both the remote UE 802 and the relay UE 804 may begin using the fallback pool to reestablish connection, at block 814. In certain aspects, the fallback pools may be in a robust frequency range (FR) (e.g., FR1) such that the fallback pool is robust, and the additional pools for relay data communication and discovery may be in another FR (e.g., FR2) where more resources are available (yet may be less robust that resources in FR1).

Certain aspects of the present disclosure are directed to quality-of-service (QoS) specific transmit (TX)/receive (RX) discovery pool for relay UEs. As described herein, a packet from the remote UE has to be forwarded to the network (NW) (e.g., base station 506) by the relay UE, and thus, incurs more latency as compared to scenarios where packets can be directly communicated between the UE and the base station. In certain aspects, periodicity for discovery message communication may be configured in an attempt to reduce the latency associated with remote UE communication. For example, the periodicity of the discovery pool for the remote UE may be configured based on the remote UEs QOS level. For example, the NW may configure different parameters for TX/RX resource pools associated to different QoS levels. A shorter periodicity of TX/RX resource pool may be configured for a QoS level with higher latency specifications. These enhancements may be applied for both L2 and L3 relays.

Certain aspects of the present disclosure are generally directed to sidelink discovery (SD)-RSRP measurement (e.g., LTE proximity-services (ProSe) relay). A ProSe UE generally refers to a UE (referred to as relay UE herein) that can provide other UEs (referred to as remote UEs) that could experience coverage problems with internet protocol (IP) connectivity. In some cases, a remote UE may measure SD-RSRP. The SD-RSRP may be used to determine whether reselection of a different relay UE is warranted. For example, a UE may apply L3 filtering on discovery DMRS (e.g., DMRS on discovery messages) that concern the same ProSe Relay UE ID. Filter coefficient may be indicated in SIB19 (e.g., for in coverage UEs) or preconfigured (e.g., OOC UEs). In other words, the coefficient used for filtering when determining the SD-RSRP may be indicated in SIB or preconfigured at the UE. In certain aspects, the DMRS being measured may be the DMRS on the communication channel on sidelink.

Certain aspects of the present disclosure are directed to measurements for relay selection for remote UEs that are not connected to any relay UE. In this case, the remote UE may measure SD-RSRP based on DMRS of PSSCH that carries (periodic) discovery message transmissions. In other words, the remote UE may receive one or more reference signals (RSs) on a sidelink channel used for transmission of one or more discovery messages by the relay UE. The remote UE may then perform one or more radio link measurements on the one or more RSs, and determining whether to connect with another relay UE based on the one or more radio link measurements.

Certain aspects of the present disclosure are directed to measurements for relay selection for remote UEs that are connected to a relay UE. In other words, unicast link (e.g., PC5 link) may be already established between the remote UE and the relay UE. In this case, the remote UE may perform measurement for SD-RSRP based on the concerned relay UE L2 ID. The measurement may be performed for both discovery and communication messages from the same source ID. In other words, the remote UE may receive, from the relay UE, one or more discovery messages on a sidelink channel, the one or more discovery messages having one or more first RSs, and also receive one or more communication messages on the sidelink channel, the one or more communication messages having one or more second RSs. The remote UE may then perform the radio link measurements on both of the one or more first RSs and the one or more second RSs, and determine whether to connect with another relay UE based on the radio link measurements.

In certain aspects, measurement configuration (e.g., such as position of DMRS and frequency) may be implemented by reusing existing configurations in SIB (e.g., for idle or inactive UEs) or by pre-configuration (e.g., for OOC UEs). The measurement configuration may indicate DMRS parameters for measurement such as corresponding frequency (e.g., absolute radio-frequency channel number (ARFCN)), DMRS configuration (e.g., PSSCH DMRS time pattern), and filter coefficient for DMRS measurement. The measurement configuration (e.g., including L3 filter) may be obtained in existing SIBX or preconfigured. The DMRS of PSSCH may be obtained in existing SIBX or preconfigured.

Figure 9:
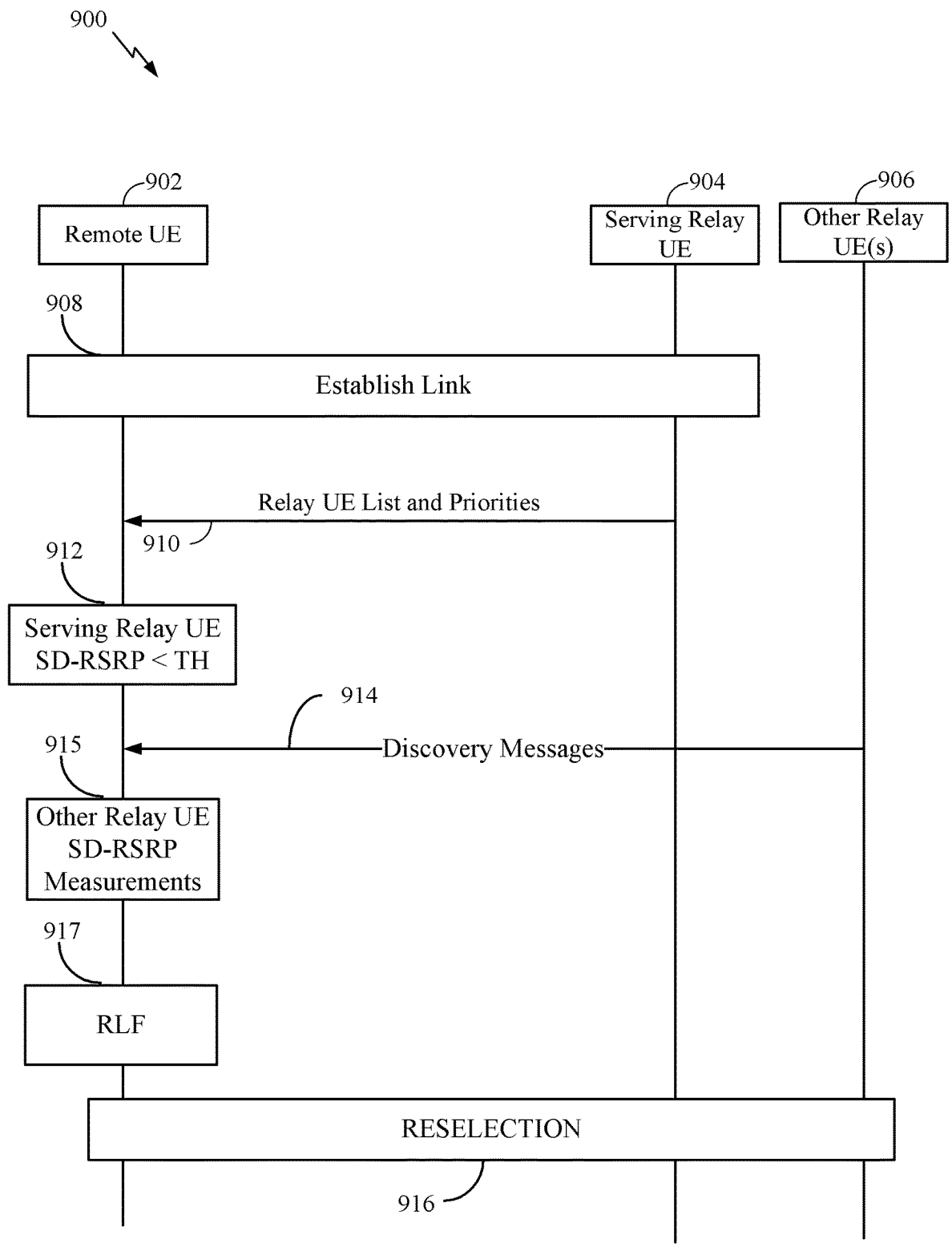
FIG. 9 illustrates a protocol for link measurement to facilitate relay reselection, in accordance with certain aspects of the present disclosure.

FIG. 9 illustrates a protocol 900 for link measurement to facilitate relay reselection, in accordance with certain aspects of the present disclosure. Relay reselection refers to a remote UE that is connected to a relay UE and is monitoring discovery messages from other relay UEs so that, in case the current relay UE radio link condition becomes poor, the remote UE can select one of the other relay UEs with the strongest radio link measurement. For example, when a serving relay UE 904 and the remote UE 902 have established a link at block 908, the remote UE 902 may obtain a message 910 indicating a list of neighboring relay UEs and associated priorities of other relay UE(s) 906 for which measurements may be performed for reselection.

The remote UE 902 may monitor for discovery messages 914 and may detect the UE relay ID in the discovery messages. If the UE relay ID in a discovery message is not part of the provided list, the discovery message may be discarded and the remote UE 902 may not perform measurement on the discovery message. If the remote UE determines that more than one relay UE is a candidate for reselection, the remote UE may use the priorities of the relay UEs as indicated to select a relay UE to reselect. The signaling of the list and priorities in message 910 may be via PC5 RRC message from the connected relay UE to the remote UE. As illustrated, at block 915, the remote UE 902 performs SD-RSRP measurements on the discovery messages from the relay UE(s) 906. Once a RLF event 917 occurs, the SD-RSRP measurements may be used to perform reselection 916 to one of the other relay UE(s) 906.

In certain aspects, the list and priorities may be decided by the relay UE 904. In other aspects, the list may be decided by the NW. The NW may send the list to the relay UE 904 via RRC message in the Uu link (e.g., the link between UE and BS), and the relay UE forwards it to the remote UE via the PC5 RRC message 910. The PC5 RRC message may be used because the relay UE is in connected mode.

In certain aspects, the list and priorities may be indicated via discovery messages which are broadcast or groupcast by the connected relay UE. In another case, the list and priorities may be indicated to the remote UE via NW directly, for example, in RRC reconfiguration if the remote UE is in connected mode or SIBx if remote UE is in idle or inactive mode. In certain aspects, if SL-RSRP is greater than a threshold, the remote UE may not monitor other relay nodes for relay reselection. In other words, the remote UE may only begin performing measurements if the signal quality associated with the currently connected relay UE drops below a threshold. For instance, at block 912, the remote UE 902 may determine that the SD-RSRP of discovery and/or data communication messages from the serving relay UE 904 is below a threshold, and if so, begin performing the measurements at block 915.

Figure 10:
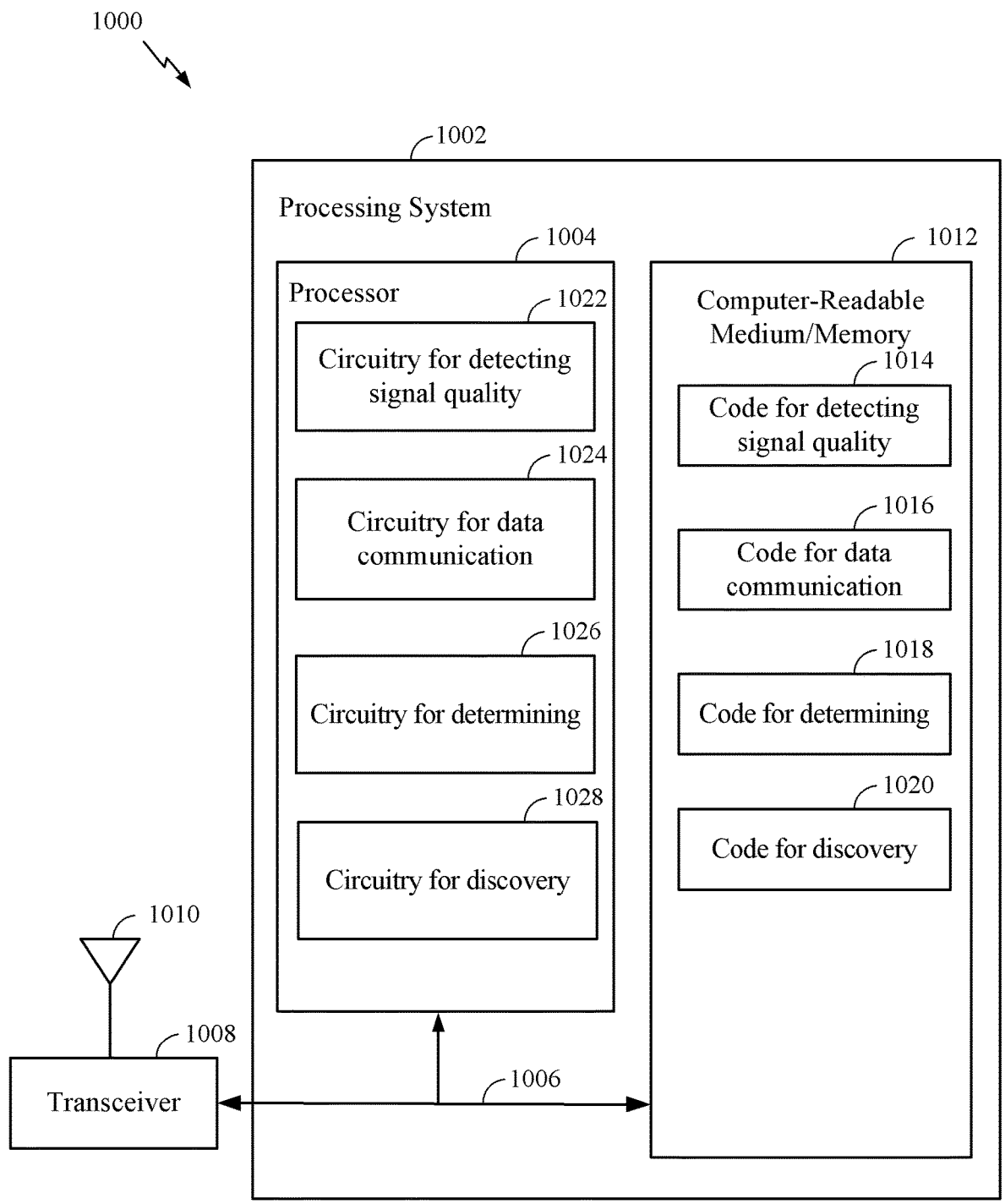
FIG. 10 illustrates a communications device that may include various components configured to perform operations for the techniques disclosed herein.

FIG. 10 illustrates a communications device 1000 that may include various components (e.g., corresponding to means-plus-function components) configured to perform operations for the techniques disclosed herein, such as the operations illustrated in FIGS. 5 and 6. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 6 and 7. In certain aspects, computer-readable medium/memory 1012 stores code 1014 for detecting signal quality (e.g., performing radio link measurement); code 1016 for data receiving/transmitting (e.g., communicating or relaying communications); code 1018 for determining a configuration, and code 1020 for discovery. In certain aspects, the processor 1004 has circuitry configured to implement the code stored in the computer-readable medium/memory 1012. The processor 1004 includes circuitry 1022 for detecting signal quality (e.g., performing radio link measurement); circuitry 1024 for data receiving/transmitting (e.g., communicating or relaying communications); circuitry 1026 for determining a configuration; and circuitry 1028 for discovery.

Figure 11:
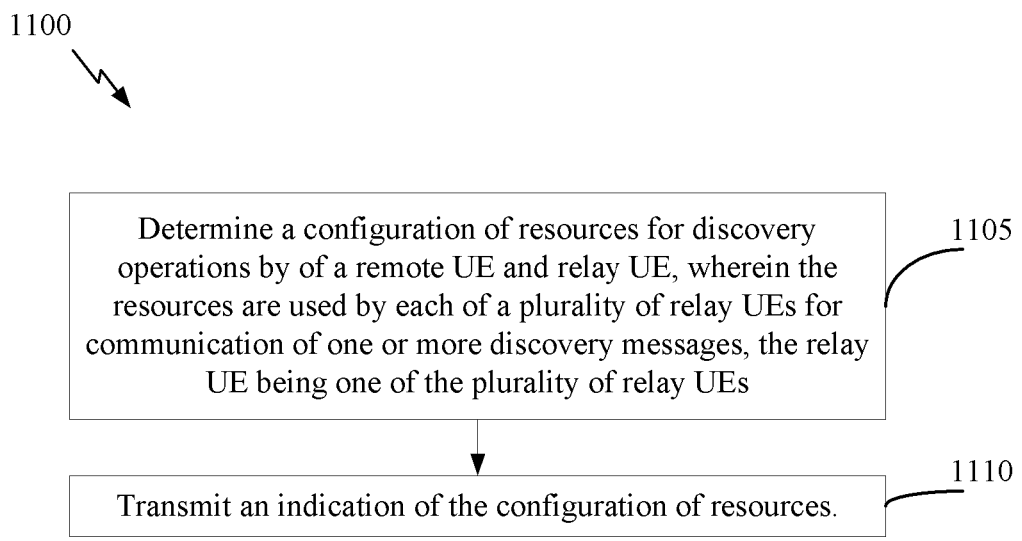
FIG. 11 is a flow diagram illustrating example operations for wireless communication, in accordance with certain aspects of the present disclosure.

FIG. 11 is a flow diagram illustrating example operations 1100 for wireless communication, in accordance with certain aspects of the present disclosure. The operations 1100 may be performed, for example, by a BS (e.g., such as the BS 110a in the wireless communication network 100). The operations 1100 may be complimentary operations by the BS to the operations 1100 performed by the UE. Operations 1100 may be implemented as software components that are executed and run on one or more processors (e.g., controller/processor 240 of FIG. 2). Further, the transmission and reception of signals by the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1100 may begin, at 1105, by determining a configuration of resources for discovery operations by of a remote UE and relay UE, wherein the resources are used by each of a plurality of relay UEs for communication of one or more discovery messages, the relay UE being one of the plurality of relay UEs, and at block 110, transmitting an indication of the configuration of resources. In certain aspects, the configuration of resources may include a configuration of resources for discovery in commercial applications and a configuration of resources for relay UE discovery. In certain aspects, the base station may transmit, to the remote UE, a message indicating one or more of the plurality of relay UEs as candidates for discovery.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing.

The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
  determining a configuration of resources for discovery of a relay UE of a plurality of relay UEs, wherein the resources are used by each of the plurality of relay UEs for communication of one or more discovery messages;
  performing discovery operations to connect with the relay UE in accordance with the configuration; and
  communicating with a network entity through the relay UE after connecting with the relay UE.

2. The method of claim 1, wherein the configuration of resources comprises a configuration of resources for discovery in commercial applications and a configuration of resources for relay UE discovery, the discovery operations to connect with the relay UE being in accordance with the configuration of the resources for relay UE discovery.

3. The method of claim 1, wherein:
  the configuration further comprises a configuration of fallback resources;
  the method further comprises detecting that a signal quality associated with an established link between the UE and the relay UE has dropped below a threshold; and the discovery operations to connect with the relay UE is performed in response to the signal quality dropping below the threshold and based on the one or more discovery messages transmitted by the relay UE via the fallback resources.

4. The method of claim 3, wherein the established link comprises a unicast link between the UE and the relay UE, the method further comprising:
   receiving an indication of communication resources via the established link; and
   communicating with the relay UE via the communication resources prior to the signal quality dropping below the threshold.

5. The method of claim 1, wherein the configuration of the resources for the discovery is based on a quality of service (QOS) level associated with the communication with the network entity through the relay UE.

6. The method of claim 5, wherein the configuration of the resources for the discovery comprises a configuration of a periodicity for communication of the one or more discovery messages, the periodicity being in accordance with the QoS level.

7. The method of claim 1, wherein performing the discovery operations comprise:
   receiving one or more reference signals (RSs) on a sidelink channel used for transmission of the one or more discovery messages by the relay UE;
   performing one or more radio link measurements on the one or more RSs; and
   determining whether to connect with another relay UE of the plurality of relay UEs based on the one or more radio link measurements.

8. The method of claim 1, wherein performing the discovery operations comprise:
   receiving, from the relay UE, the one or more discovery messages on a sidelink channel, the one or more discovery messages having one or more first RSs;
   receiving one or more communication messages on the sidelink channel, the one or more communication messages having one or more second RSs;
   performing radio link measurements on the one or more first RSs and the one or more second RSs; and
   determining whether to connect with another relay UE of the plurality of relay UEs based on the radio link measurements.

9. The method of claim 1, further comprising receiving, on a sidelink channel between the UE and the relay UE, a list of one or more other relay UEs of the plurality of relay UEs, wherein performing the discovery operations comprises:
   performing one or more radio link measurements of one or more discovery messages from the one or more other relay UEs in accordance with the received list; and
   determining whether to connect with one of the one or more other relay UEs for communication based on the one or more radio link measurements.

10. The method of claim 9, wherein the list of the one or more other relay UEs is received on a radio resource control (RRC) message on the sidelink channel.

11. The method of claim 9, wherein performing the discovery operations comprises receiving the one or more discovery messages via the resources for discovery, and wherein the list of the one or more other relay UEs is received via the one or more discovery messages.

12. The method of claim 9, further comprising receiving a message from a network entity, wherein the list of the one or more other relay UEs is received via the message.

13. The method of claim 1, wherein:
   the method further comprises performing a radio link measurement to determine a quality of a sidelink channel between the UE and the relay UE; and
   performing the discovery operations comprises performing one or more other radio link measurements of the one or more discovery messages received from one or more other relay UEs of the plurality of relay UEs, wherein the one or more other radio link measurements is performed if the quality of the sidelink channel drops below a threshold.

14. A method for wireless communication by a relay user equipment (UE), comprising:
   determining a configuration of resources for discovery of a UE, wherein the resources are used by each of a plurality of relay UEs for communication of one or more discovery messages, the relay UE being one of the plurality of relay UEs;
   performing discovery operations to connect with the UE in accordance with the configuration; and
   relaying communications between a network entity and the UE after connecting with the UE.

15. The method of claim 14, wherein the configuration of resources comprises a configuration of resources for discovery in commercial applications and a configuration of resources for relay UE discovery, the discovery operations to connect with the relay UE being in accordance with the configuration of the resources for relay UE discovery.

16. The method of claim 14, wherein:
   the configuration further comprises a configuration of fallback resources;
   the method further comprises detecting that a signal quality associated with an established link between the UE and the relay UE has dropped below a threshold; and
   the discovery operations to connect with the UE is performed in response to the signal quality dropping below the threshold and based on the one or more discovery messages transmitted by the relay UE via the fallback resources.

17. The method of claim 16, wherein the established link comprises a unicast link between the UE and the relay UE, the method further comprising:
   transmitting an indication of communication resources via the established link; and
   communicating with the UE via the communication resources prior to the signal quality dropping below the threshold.

18. The method of claim 14, wherein the configuration of the resources for the discovery is based on a quality of service (QOS) level associated with the communications.

19. The method of claim 18, wherein the configuration of the resources for the discovery comprises a configuration of a periodicity for communication of the one or more discovery messages, the periodicity being in accordance with the QoS level.

20. The method of claim 14, further comprising transmitting, on a sidelink channel between the UE and the relay UE, a list of one or more other relay UEs of the plurality of relay UEs, wherein the one or more other relay UEs are candidates for selection by the UE.

21. The method of claim 20, wherein the list of the one or more other relay UEs is transmitted on a radio resource control (RRC) message on the sidelink channel.

22. The method of claim 20, wherein performing the discovery operations comprises transmitting the one or more discovery messages via the resources for discovery, and wherein the list of the one or more other relay UEs is transmitted via the one or more discovery messages.

23. A method for wireless communication, comprising:
determining a configuration of resources for discovery operations by of a remote user equipment (UE) and relay UE, wherein the resources are used by each of a plurality of relay UEs for communication of one or more discovery messages, the relay UE being one of the plurality of relay UEs; and
transmitting an indication of the configuration of resources.

24. The method of claim 23, wherein the configuration of resources comprises a configuration of resources for discovery in commercial applications and a configuration of resources for relay UE discovery.

25. The method of claim 23, further comprising transmitting, to the remote UE, a message indicating one or more of the plurality of relay UEs as candidates for discovery.

26. An apparatus for wireless communication by a user-equipment (UE), comprising:
a processing system configured to:
determine a configuration of resources for discovery of a relay UE of a plurality of relay UEs, wherein the resources are used by each of the plurality of relay UEs for communication of one or more discovery messages; and
perform discovery operations to connect with the relay UE in accordance with the configuration; and
a transceiver configured to communicate with a network entity through the relay UE after connecting with the relay UE.

27. The apparatus of claim 26, wherein:
the configuration of resources comprises a configuration of resources for discovery in commercial applications and a configuration of resources for relay UE discovery; and
the processing system is configured to perform the discovery operations to connect with the relay UE in accordance with the configuration of the resources for relay UE discovery.

28. The apparatus of claim 26, wherein:
the configuration further comprises a configuration of fallback resources; and
the processing system is further configured to detect that a signal quality associated with an established link between the UE and the relay UE has dropped below a threshold; and
the processing system is configured to perform the discovery operations to connect with the relay UE in response to the signal quality dropping below the threshold and based on the one or more discovery messages transmitted by the relay UE via the fallback resources.

29. The apparatus of claim 26, wherein the configuration of the resources for the discovery is based on a quality of service (QOS) level associated with the communication with the network entity through the relay UE.

30. The apparatus of claim 26, wherein the processing system being configured to perform the discovery operations comprises the processing system being configured to:
receive one or more reference signals (RSs) on a sidelink channel used for transmission of the one or more discovery messages by the relay UE;
perform one or more radio link measurements on the one or more RSs; and
determine whether to connect with another relay UE of the plurality of relay UEs based on the one or more radio link measurements.

* * * * *